US009735890B2

(12) United States Patent
Agarwal et al.

(10) Patent No.: US 9,735,890 B2
(45) Date of Patent: Aug. 15, 2017

(54) QUANTUM COMMUNICATIONS OF A TWO-QUBIT STATE

(71) Applicant: VENCORE LABS, INC., Basking Ridge, NJ (US)

(72) Inventors: Anjali Agarwal, Basking Ridge, NJ (US); James Dailey, Basking Ridge, NJ (US); Paul Toliver, Basking Ridge, NJ (US); Nicholas Peters, Basking Ridge, NJ (US)

(73) Assignee: Vencore Labs, Inc., Basking Ridge, NJ (US)

(*) Notice: Subject to any disclaimer, the term of this patent is extended or adjusted under 35 U.S.C. 154(b) by 54 days.

(21) Appl. No.: 14/946,955

(22) Filed: Nov. 20, 2015

(65) Prior Publication Data

US 2017/0019185 A1     Jan. 19, 2017

Related U.S. Application Data

(60) Provisional application No. 62/082,859, filed on Nov. 21, 2014.

(51) Int. Cl.
*H04B 10/70* (2013.01)
*G06N 99/00* (2010.01)
*H04J 14/00* (2006.01)
*H04J 1/08* (2006.01)

(52) U.S. Cl.
CPC .......... *H04B 10/70* (2013.01); *G06N 99/002* (2013.01); *H04J 1/08* (2013.01); *H04J 14/00* (2013.01)

(58) Field of Classification Search
CPC ................ H04B 10/70; H04B 10/2507; H04B 10/25137; G02F 1/39
USPC .......................................................... 398/82
See application file for complete search history.

(56) References Cited

U.S. PATENT DOCUMENTS

| | | | |
|---|---|---|---|
| 6,897,434 B1* | 5/2005 | Kumar | B82Y 10/00 250/227.11 |
| 7,773,294 B2* | 8/2010 | Brunet | H01S 3/06754 359/341.3 |
| 9,294,191 B2* | 3/2016 | Peters | H04B 10/70 |
| 2015/0055961 A1* | 2/2015 | Meyers | B82Y 10/00 398/140 |

OTHER PUBLICATIONS

C. Weedbrook, et al., *Guassian Quantum Information*, Review of Modern Physics vol. 84, Issue 2, p. 621, May 1, 2012.
H. Takesue, et al., *Generation of Polarization Entangled Photon Pairs Using Silicon Wire Waveguide*, Optics Express, vol. 16, No. 8, p. 5721, Apr. 14, 2008.

(Continued)

*Primary Examiner* — Don N Vo
(74) *Attorney, Agent, or Firm* — George S. Blasiak, Esq.; Heslin Rothenberg Farley & Mesiti, PC

(57) ABSTRACT

In one aspect, there is provided a method for transmitting a two-qubit state. The method includes: propagating the two-qubit state onto a transmission waveguide, wherein the propagating includes distributing the two-qubit state about a certain phase; and transmitting the two-qubit state through the transmission waveguide using a pump pulse having the certain phase, wherein the pump pulse is provided in a manner so that the transmission waveguide functions as an optical phase sensitive amplifier (OPSA).

19 Claims, 2 Drawing Sheets

(56) References Cited

OTHER PUBLICATIONS

M. Vasilyev, *Distributed Phase-Sensitive Amplification*, Optics Express, vol. 13, No. 19, p. 7563, Sep. 19, 2005.
C.J. McKinstrie, *Phase-Sensitive Amplification in a Fiber*, Optics Express, vol. 12, No. 30, p. 4973, Oct. 4, 2004.
Y.C. Zhang, *Improvement of two-way continuous-variable quantum key distribution using optical amplifiers*, J. Phys. B: At. Mol. Phys. B47, 035501, Feb. 20, 2014.
K. Inoue, *Polarization Independent Wavelength Conversion Using Fiber Four-Wave Mixing with Two Orthogonal Pump Lights of Different Frequencies*, Journal of Lightwave Technology, vol. 12, No. 11, Nov. 1994.
I. Marcikic, et al, *Distribution of Time-Bin Entangled Qubits Over 50LM of Optical Fiber*, Physical Review Letters 93, 180502, Apr. 21, 2014.
X.Y. Zou, et al., *Induced Coherence and Indistinguishability in Optical Interference*, Physical Review Letters, vol. 67, No. 3, p. 318 Jul. 15, 1991.
H. Fan, et al., *Quantum Cloning Machines and the Applications*, Physics Reports, 10.1016/j.physrep., Aug. 2, 2014.
J. Zhang et al., *Phase-Sensitive Manipulations of Squeezed Vacuum Field in an Optical Parametric Amplifier inside an Optical Cavity*, Physical Review Letters, 101, 233602, Nov. 2, 2008.
T.J. Herzog, et al., *Frustrated Two-Photon Creation via Interference*, Physical Review Letters, vol. 72, No. 5, p. 629 Jan. 31, 1994.
J.D. Franson, et al., *Bell Inequality for Position and Time*, Physical Review Letters, vol. 62, No. 19, p. 2205, May 8, 1989.
H. Takesue, et al., *1.5-μm Band Quantum-Correlated Photon Pair Generation in Dispersion-Shifted Fiber: Suppression of Noise Photons by Cooling Fiber*, Optics Express, vol. 13, No. 20, p. 7832, Oct. 3, 2005.
Y. Shang, et al., *Continuous Variable Entanglement Enhancement and Manipulation by a Sub-Threshold Type-II Optical Parametric Amplifier*, Optics Letters, vol. 35, Issue 6, p. 853-855, Mar. 6, 2010.
M. Ricci, et al., *Separating the Classical and Quantum Information via Quantum Cloning*, Physical Review Letters, 95, 090504, Aug. 26, 2005.

M. Hall, et al., *Drop-In Compatible Entanglement for Optical-Fiber Networks*, Optics Express, vol. 17, No. 17, p. 14558, Aug. 17, 2009.
S. Fossier, et al., *Improvement of Continuous-Variable Quantum Key Distribution Systems by Using Optical Amplifiers*, Journal of Physics B: Atomic, Molecular and Optical Physics, vol. 42, No. 11, May 15, 2009.
C.J. McKinstrie, et al., *Effects of Transmission on Gaussian Optical States*, Optics Express, vol. 23, No. 8, p. 10856, Apr. 20, 2015.
R.T. Glasser, et al., *Entanglement-Seeded-Dual Optical Parametric Amplification: Applications to Quantum Communication, Imaging, and Metrology*, Physical Review Letters, A 78, 012339, Apr. 10, 2008.
R.C. Pooser, et al., *Low-Noise Amplification of a Continuous Variable Quantum State*, Physical Review Letters, 103, 010501, Jun. 29, 2009.
Y. Shaked, et al., *Observing the Non-Classical Nature of Ultra-Broadband Bi-Photons at Ultrafast Speed*, New Journal of Physics, vol. 16, 053012, Apr. 2, 2014.
H. Zhang, et al., *Improving the Performance of the Four-State Continuous-Variable Quantum Key Distribution by Using Optical Amplifiers*, Physical Review A., American Physical Society, vol. 86, Issue 2, p. 022338, Aug. 29, 2012.
F.W. Sun, et al., *Stimulate Emission as a Result of Multiphoton Interference*, Physical Review A., American Physical Society, vol. 99, Issue 4, p. 043601, Jul. 25, 2007.
P.G. Kwiat, et al., *High-Visibility Interference in a Bell-Inequality Experiment for Energy and Time*, Physical Review A., American Physical Society, vol. 47, Issue 4, p. R2472-R2475, Apr. 1, 1993.
A. Lamas-Linares, et al., *Stiumlated Emission of Polzarization-Entangled Photons*, Letters to Nature, vol. 412, pp. 887-890, Aug. 30, 2001.
X. Li, et al., *Storage and Long-Distance Distribution of Telecommunications-Band Polarization Entanglement Generated in an Optical Fiber*, Optical Letters, vol. 30, Issue 10, p. 1201-1203, May 15, 2005.
A. Agarwal, et al., *Propagation of Two-Qubit Stales using Interference in a Distributed Phase Sensitive Amplifier*, OSA Technical Digest (Optical Society of America, 2015).
P. Toliver, et al., *Continuously Active Interferometer Stabilization and Control for Time-Bin Entanglement Distribution*, Optics Express, vol. 23, No. 4, Feb. 10, 2015.

* cited by examiner

QUANTUM COMMUNICATIONS OF A TWO-QUBIT STATE

CROSS-REFERENCE TO RELATED APPLICATIONS

This application claims the benefit of priority of U.S. Provisional App. No. 62/082,859 filed Nov. 21, 2014, entitled "Quantum Communications of a Two-Qubit State" which is incorporated by reference in its entirety.

STATEMENT OF GOVERNMENT RIGHTS

The invention was made with government support under Contact No. W31P4Q-13-C-0069 awarded by the Defense Advanced Research Projects Agency (DARPA). The government has certain rights in the present invention.

FIELD

The present disclosure relates to quantum communications (e.g., transmission and/or receiving) of a two-qubit state.

BACKGROUND

The loss suffered by qubits during direct transmission over waveguide channels remains a challenge that limits the throughput of quantum communications. Contrary to the classical case, in the analogous quantum case, an unknown qubit cannot be measured and regenerated without adding errors as a consequence of the no cloning theorem.

Quantum repeater networks have been proposed, using an "offline" step to distribute, repair, and store entangled qubit pairs before they are needed. In such a case, when a qubit needs to be transported, the pre-distributed entanglement can be used to connect two locations with a shared entangled pair, followed by teleportation of the qubit. Thus, the "runtime" quantum cost is not directly related to the channel loss. However, even if fully realized, complexity and cost of quantum repeater networks may not be required for all potential quantum communications applications.

BRIEF SUMMARY

The shortcomings of the prior art are overcome, and additional advantages are provided, through the provision, in one aspect, of a method for transmitting a two-qubit state. The method includes: propagating the two-qubit state onto a transmission waveguide, wherein the propagating includes distributing the two-qubit state about a certain phase; and transmitting the two-qubit state through the transmission waveguide using a pump pulse having the certain phase.

Additional features and advantages are realized through the techniques of the present disclosure. Other embodiments and aspects of the disclosure are described in detail herein and are considered a part of the claimed disclosure.

BRIEF DESCRIPTION OF THE SEVERAL VIEWS OF THE DRAWINGS

One or more aspects of the present disclosure are particularly pointed out and distinctly claimed as examples in the claims at the conclusion of the specification. The foregoing and other objects, features, and advantages are apparent from the following detailed description taken in conjunction with the accompanying drawings in which:

DETAILED DESCRIPTION

Figure 1:
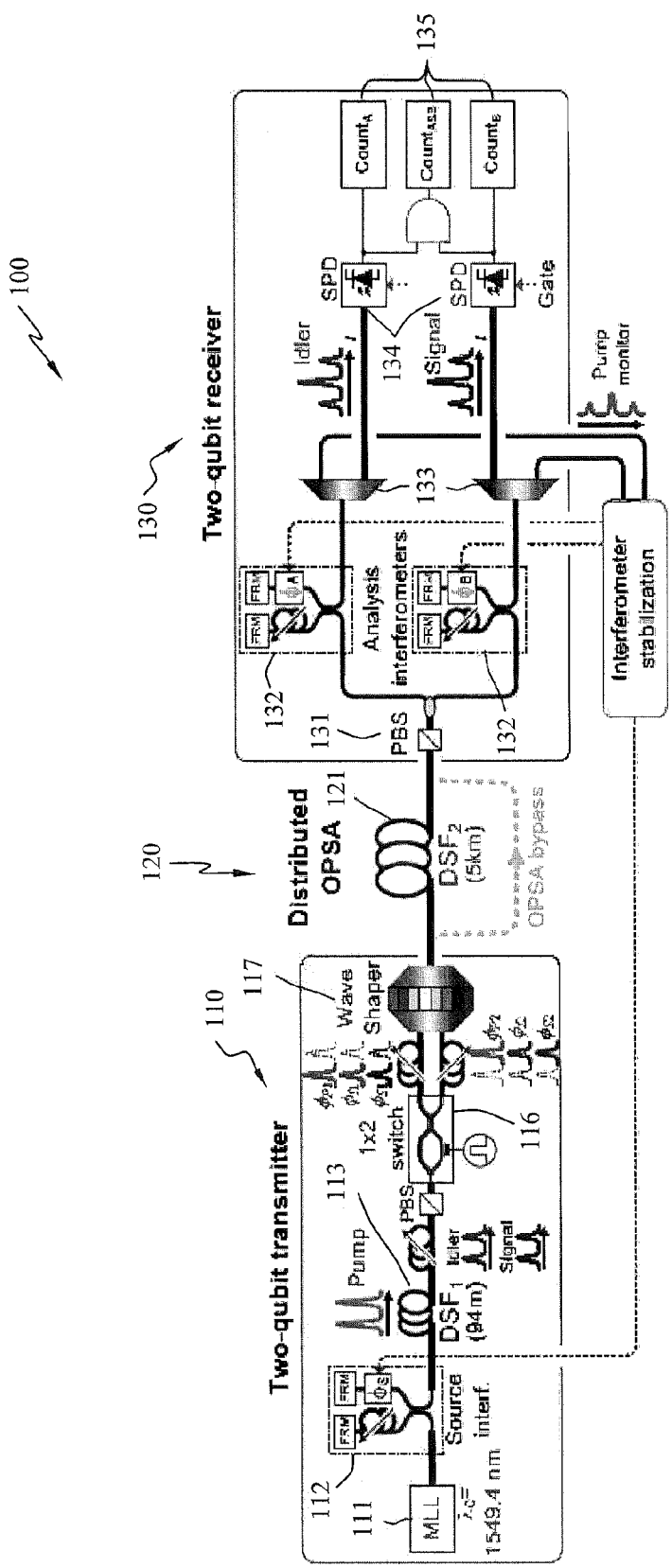
FIG. 1 is a block diagram of a system for quantum communications, as set forth herein.

Aspects of the present disclosure and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the disclosure in detail. It should be understood, however, that the detailed description and the specific examples, while indicating aspects of the disclosure, are given by way of illustration only, and not by way of limitation. Various substitutions, modifications, additions, and/or arrangements, within the spirit and/or scope of the underlying inventive concepts will be apparent to those skilled in the art from this disclosure.

The present disclosure provides, in part, methods for transmitting a two-qubit state over a transmission waveguide and related devices and systems. In one embodiment, a two-qubit state, such as multiple non-orthogonal two-qubit quantum states, can be transmitted over long distances without loss reducing the throughput using the techniques described herein. In another embodiment, the techniques disclosed herein can be used over short distances, in photonic integrated circuits.

By way of explanation, methods such as in-line optical amplification can improve performance. In addition, in classical communications, a phase-sensitive amplifier can amplify a signal quadrature without, in principle, adding noise, which is theoretically impossible for phase-insensitive amplifiers. Further, distributed phase-sensitive amplifiers have logarithmically better noise properties than lumped amplifiers.

In one embodiment, OPSAs can be used for improved quantum communications. In such a case, the use of an OPSA adds requirements to the input states. For instance, when using a frequency non-degenerate OPSA configuration, two-mode states, i.e., two-photon encodings, can be used. In addition, states can be restricted to a subspace of all possible encoded states, due to the phase-sensitive nature of the amplifier. Further, this approach may be thought of as using a phase-covariant cloner with restricted input states to achieve higher fidelities than possible with arbitrary inputs to a universal quantum cloner. In another example, such techniques can be used to encode a phase value and partially protect it from loss. In such an example, the techniques can be valuable for quantum computing or future quantum communications protocols. In other embodiments, tradeoffs may be made between the quantum state value, state probability, state fidelity, the transmission loss and the amplifier properties.

In another embodiment, cloners and OPSAs can improve the likelihood of state reception. For instance, OPSAs can be used for improving the detection efficiency and therefore the throughput of continuous variable quantum key distribution. In addition, entangled pairs may be transmitted through an optimally aligned OPSA while maintaining throughput and visibility. Further, the transmission of two non-orthogonal quantum states can be accomplished through a distributed OPSA, e.g. directly sending quantum information with loss resilience. In another embodiment, a distributed OPSA may be used to improve the probability of transmission of phase-encoded quantum states not optimally aligned to the OPSA. In such a case, the input state quality as measured by visibility can be maintained.

Generally stated, provided herein, in one aspect, is a method for transmitting a two-qubit state. The method includes: propagating the two-qubit state onto a transmission waveguide, wherein the propagating includes distributing the two-qubit state about a certain phase; and transmitting the two-qubit state through the transmission waveguide using a pump pulse having the certain phase.

In one embodiment, the pump pulse is provided in a matter so that the transmission waveguide functions as an optical phase sensitive amplifier (OPSA). In another embodiment, the two-qubit state includes multiple non-orthogonal quantum states. In another embodiment, the two-qubit state is phase misaligned with the certain phase, and pump pulse is capable of transmitting the two-qubit state notwithstanding the phase misalignment of the two-qubit state.

In another embodiment, the two-qubit state constructively interferes with the pump pulse thereby facilitating transmission of the two-qubit state through the transmission waveguide. In a further embodiment, the transmission waveguide comprises a length of optical fiber and the transmitting comprises amplifying the two-qubit state over the length of the optical fiber using the pump pulse.

In another aspect, a device for transmitting a two-qubit state is presented. The device includes: a source, the source being configured to distribute two-qubit state about a certain phase; and a transmission waveguide, the transmission waveguide being configured to propagate the two-qubit state using a pump pulse having the certain phase. In one embodiment, the transmission waveguide comprises an OPSA, the OPSA being configured to use the pump pulse with the certain frequency.

In another aspect, a system for quantum communications is presented. The system includes: a source, the source being configured to distribute two-qubit state about a certain phase; a transmission waveguide, the transmission waveguide being configured to propagate the two-qubit state using a pump pulse having the certain phase; and a receiver, the receiver being configured to receive the two-qubit state.

Reference is made below to the drawings, which are not drawn to scale for ease of understanding, wherein the same reference numbers used throughout different figures designate the same or similar components.

FIG. 1 is a block diagram of a system 100 for quantum communications, as set forth herein. In the embodiment of FIG. 1, system 100 comprises a multi-qubit (two-qubit) transmitter 110, a distributed optical phase sensitive amplifier (OPSA) 120, and a multi-qubit (two-qubit) receiver 130.

In one embodiment, transmitter 110 comprises a dispersion-shifted fiber (DSF)-based time-bin entangled photon pair source. For instance, two time-delayed copies of pump pulses from a mode-locked laser (MLL) 111 centered at 1549.4 nm with a 47-MHz repetition rate can be created using a fiber-Michelson interferometer 112 with 5 ns path-length mismatch, as one specific example. In such a case, the source can be configured to generate a train of double pulses each defining one of two time-bins. In addition, these pulses can pump a 94-m long DSF 113 to produce time-bin entangled signal-idler photon pairs through, for example, spontaneous four wave mixing. In one embodiment, DSF 113 is cooled to reduce Raman scattering. The signal and idler pairs may for example, be selected ±400 GHz (±3.2 nm) from the pump wavelength and thus all are in the lowest-loss telecom transmission window. Further, the pump center wavelength is chosen to be close to the zero dispersion wavelength of DSF 113 in the source and OPSA 121 to maximize the four-wave mixing efficiency.

In another embodiment, after pair creation in DSF 113, a fiber polarization controller and polarizer are used to suppress cross-polarized Raman noise from the source and also align the states to a 1×2 optical switch 116. For example, optical switch 116 is a high-speed electro-optic modulator. In a further embodiment, an electronic gating signal synchronized to the optical input triggers the switch to temporally de-multiplex the two time-bins onto a pair of spatially distinct output fibers. In one example, the two fibers are sent into two different input ports of a wave shaper 117 that can independently adjust the amplitude and the relative phases between the signal ($\phi$ Sn), idler($\phi$ In), and pump ($\phi$ Pn) wavelengths in each of the time bins (labeled with n). In such a manner, the pump can have a certain phase, and the two-qubit state can be distributed about the certain phase of the pump. By way of example, a commercial wave shaper can be used, such as a WaveShaper 4000S available from Finisar Corporation of Sunnyvale, Calif.

In one embodiment, wave shaper 117 recombines the two time-bins onto a single fiber once appropriate phase-shifts have been applied to create one of two non-orthogonal states. For instance, the output of wave shaper 117 is connected to OPSA 120 and receiver 130. In addition, the pump is demultiplexed after the analysis interferometers and used to lock the phase reference frame of both analysis interferometers 132 to the source interferometer 112. Such a configuration allows wave shaper 117 to propagate the two non-orthogonal states (i.e., two-qubit state) onto the transmission waveguide (fiber).

In another embodiment, there are two distinct two-photon interference effects in this system. For instance, the first interference effect is between the amplitude of pairs injected into OPSA 120 and the amplitude of pairs spontaneously generated in the distributed OPSA channel itself. In one example, this effect is controlled at transmitter 110 by setting the input two-photon state and pump parameters of OPSA 120. This allows for a pump pulse having a certain phase of the OPSA. In another example, the second interference effect arises from the time-bin entangled states we employ to carry information. In such a case, this interference is observed at the receiver 130 by a two-photon time-bin entanglement interference fringe measurement. Further, this measurement is made to characterize the two non-orthogonal states before and after transmission through OPSA 120.

In another embodiment, at transmitter 130, changing the relative phases between the pump and the injected two-photon states gives rise to phase-sensitive interference, and this can be used to amplify or de-amplify the photon pairs sent into OPSA 120. For example, such an interference effect can be obtained where short, negligible-loss, nonlinear crystals are employed. In a further embodiment, OPSA 120 can include a 5-km long DSF fiber with non-negligible loss and weak instantaneous gain to only compensate for the fiber loss, to minimize higher order photon number creation.

In one embodiment, phases and pump intensity at transmitter 110 are set to optimize interference inside OPSA 120. For instance, this is done with analysis interferometers 132 removed to avoid their lumped loss and eliminate the interference that would otherwise result from the time-bin entanglement. In addition, pump, signal, and idler phases are first adjusted in wave shaper 117 to obtain maximum gain in OPSA 120 (e.g., initially both time bins have the same settings). In addition, the pump power is adjusted so the two-photon gain in OPSA 120 approximately compensates for the two-photon loss it introduces. Further, the total average pump power injected in OPSA 120 is −38.5 dBm, which is 35 dB below the average pump power used in the time-bin entangled source. In addition, the pump power and phase are established and remain the same for the non-orthogonal state transmission.

Next, with this fixed pump, the four relative phases of the two time-bins for the signal and idler are set to produce a two-qubit state of the form:

$$|\psi \pm (\phi)\rangle = \frac{1}{\sqrt{2}} [e^{\pm i\phi} |00\rangle + e^{\mp i\phi}|11\rangle] \quad (1)$$

In another embodiment, for $\phi \neq 2\pi m$, where m is an integer, these two states are symmetrically distributed (e.g., in phase) about the optimally-amplified state $(|00\rangle + |11\rangle)/\sqrt{2}$ and are equally affected by the amplifier albeit with a lower gain than for the optimal state. In such a case, although the two-qubit states are misaligned with the optimal phase of the OPSA, the OPSA (and the pump pulse thereof) is capable of transmitting and amplifying the two-qubit states notwithstanding the phase misalignment. As $\phi$ increases from zero, $\psi$ experiences decreasing levels of gain. For $$\phi = \frac{\pi}{2} m$$
$$m > 0,$$

there will be no amplification and at slightly larger phases, de-amplification occurs. In another example, additional states can be sent by modifying the OPSA pump properties, and the subspace of states which may be transmitted through the OPSA channel to reduce the impact of loss through amplification is a significant fraction of all possible states. By way of example, to demonstrate the efficacy of such an encoding we set $$\phi = \frac{\pi}{8}$$

so the transmitted states are maximally non-orthogonal in that their fidelity is ½, yielding:

$$|\pm\rangle = \frac{1}{\sqrt{2}} [e^{\pm i\frac{\pi}{8}} |00\rangle + e^{\mp i\frac{\pi}{8}}|11\rangle]$$

In a further embodiment, before discussing the two photon interference (TPI) measurements, we present results on the photon pair flux as measured by the coincidence counting rates after transmission through the OPSA both when it is active and not active (direct transmission). For this measurement, the OPSA input state is set to |+⟩ and the pump power and phase are set as above. In this case, the total photon pair flux for the two time-bins is measured, i.e., there are only two time bins as opposed to three when the analysis interferometers are in place. First the direct transmission case is measured by blocking the pump at the OPSA input yielding 159±13 coincidences in 50 s. Next the pump is unblocked and the coincidence rate is 266±16 per 50 s. The measured signal-idler coincidences are 2.2±0.4 dB greater with the OPSA active. Inclusion of an OPSA leads to coincidence counting rates that exceed what is possible via direct transmission by more than 5 standard deviations.

In another embodiment, spontaneous emission contributes to the result. For instance, the generation of spontaneous photon pairs is measured in the 5-km distributed OPSA channel by blocking the input signal and idler photon pairs in both time-bins using the wave shaper 117. For example, for the same pump power established above, which compensates the fiber loss, the measured coincidence counting rates due to spontaneous emission is smaller by a factor of ≈14 compared to the coincidence counting rates when the signal and idler pairs are injected into the active OPSA. In addition, the spontaneous pairs are created in the optimally aligned state $(|00\rangle + ^-|11\rangle)/\sqrt{2}$. Further, since the spontaneous pairs are generated in a state different from the two non-orthogonal states that are used in transmission, they will be partially rejected in analysis interferometers 132, which are aligned to analyze the two transmitted non-orthogonal states. In one example, the spontaneous pair generation is an insignificant source of noise. In another example, at longer distances where the spontaneous emission may be larger, its suppression by analysis interferometers 132 will help mitigate its impact.

Figures 2A, 2B:
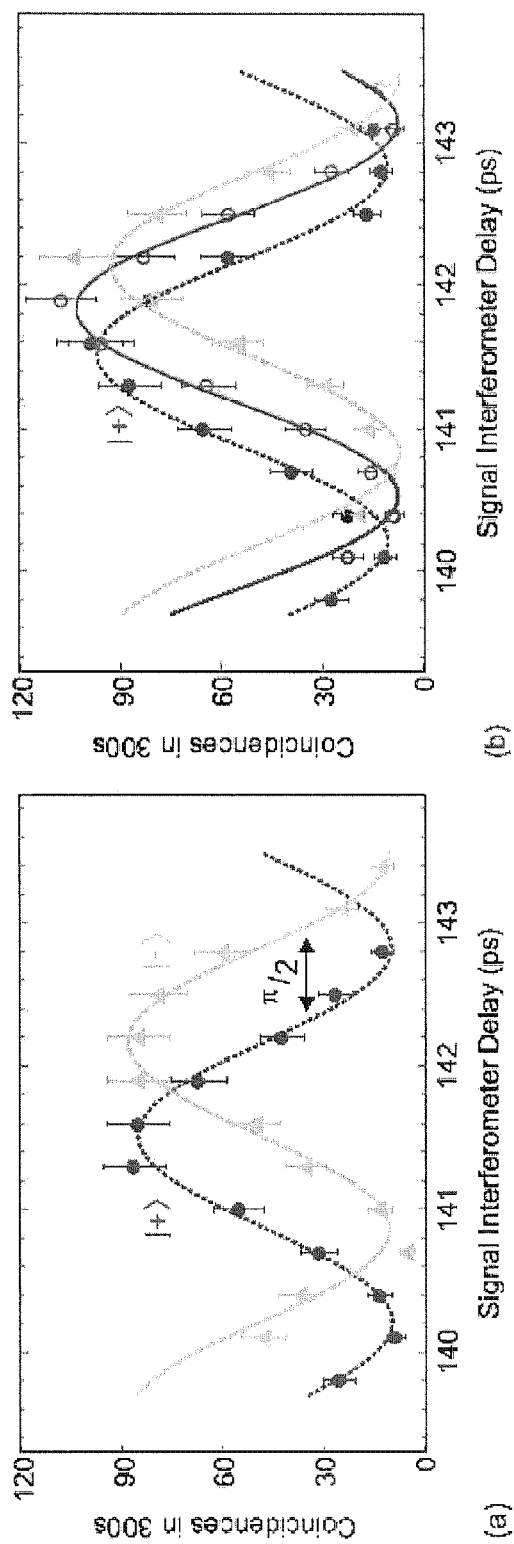
FIGS. 2A & 2B are graphs of transmitted and received quantum states, as set forth herein.

FIGS. 2A & 2B are graphs of transmitted and received quantum states, as set forth herein. Having characterized OPSA 120, in another example, we now look at analyzing the encoded input states before and after OPSA 120 by re-inserting analysis interferometers 132 at the receiver. For example, the analysis is carried out with a two-photon time-bin state analysis system comprised of a polarizing beam splitter 131 to suppress cross-polarized Raman noise, a passive beam splitter (a passive splitter sends half of the signal photons to the idler analysis arm, and vice versa, which are not measured, and additional detectors to measure them could be added), two imbalanced interferometers which are matched to the pump interferometer, optical filters, single photon detectors and coincidence counting circuitry. To sweep the TPI curve for |+⟩ and |−⟩, a small delay is varied to change the phase between the long and short paths of one analysis interferometer. For example, this delay is short relative to the time bin spacing, the detector gate width and the pulse width. In such a case, this measurement has the effect of making the following projection:

$$\left|\frac{1}{\sqrt{2}}(\langle 00| + \langle 11|e^{i\delta})|\pm\rangle\right|^2 = \cos^2\left[\frac{\delta}{2} \mp \frac{\pi}{8}\right]$$

from which one can see the two non-orthogonal states have minima spaced by ¼ of a fringe period. With reference to FIG. 2A, the TPI measurements of the two non-orthogonal input states before OPSA 120 have the expected behavior. Each raw data point is the result of counting for 300 s and has not had any accidental coincidences subtracted from it. The coincidence data is fit using the following function to extract the visibility (V): $y = A(1 - V \cos[2\pi ft - \phi_f])$ where A is the amplitude, f is the frequency, and $\phi_f$ is the phase. The extracted visibilities of the |±⟩ input states are the same within error and are 81%±5%.

Turning to FIG. 2B, the states are analyzed after transmission through OPSA 120. The states |±⟩ are created and sent through OPSA 120, such as a 5-km long OPSA, after which they are characterized by a two-photon interference measurement. The extracted raw visibilities are 86%±4% and 81%±4%. To within error of the experiment, both the visibility and the counting rates are the same before and after transmission through the distributed OPSA. Note that if the OPSA pump is turned off, then the maximum coincidence rate drops by ≈3 dB (to ≈45 coincidences per 300 s) due to the 5-km long DSF fiber loss. The measured TPI curve for a state that is aligned optimally to the OPSA pump phase, which corresponds to the (|00⟩+|11⟩)/√2 is shown in FIG. 2B. This state, which is offset by $$\pm\frac{\pi}{4}$$

from the two non-orthogonal states, results in a slightly higher maximum coincidence counting rate due to its alignment with the OPSA gain peak. The visibility obtained through curve-fitting is 87%±4%. Our results demonstrate that the distributed OPSA supports the transmission of both non-orthogonal states equally with no measurable degradation in the state visibility while improving the transmission probability compared to direct transmission. Similar to the measurements with analysis interferometers removed above, the OPSA-enabled transmission measurements after state analysis also exceed what is possible via direct transmission by more than 5 standard deviations.

In one embodiment, OPSA 120 is a 5-km OPSA. In another embodiment, assessments of the input-output quantum state fidelity for coherent states suggests that the benefits provided by using a distributed OPSA scales to longer distances greater than 5-km. For example, though we observe no measureable degradation in our experiment, the phase sensitive amplifier adds noise arising from vacuum fluctuations, which linearly increases with increasing loss and will ultimately constrain the maximum tolerable loss.

As disclosed herein, we demonstrate that a distributed OPSA can improve the transmission of non-orthogonal two-qubit quantum states with no measureable degradation in state quality as quantified by the two-photon interference visibility. The transmission improvement exceeds what is possible via direct transmission by more than 5 standard deviations. While this work focuses on utilizing optical fiber, in other embodiments, the techniques disclosed herein are also applicable to photonic integrated circuits, which are a critical enabling technology for quantum computers and quantum networks. In addition, the encoding and amplification scheme disclosed herein can enable high efficiency routing of qubits in such systems.

Additional aspects of apparatus, systems and methods herein are set forth in Appendix A entitled "Loss resilience for two-qubit state transmission using distributed phase sensitive amplification" which is appended hereto and which forms part of the present disclosure.

Additional aspects of apparatus, systems and methods herein are set forth in Appendix B entitled "Entangled-pair transmission improvement using distributed phase-sensitive amplification" which is appended hereto and which forms part of the present disclosure.

A small sample of apparatus, systems and methods set forth herein include the following: A1. A method for transmitting a two-qubit state, the method comprising: propagating the two-qubit state onto a transmission waveguide, wherein the propagating includes distributing the two-qubit state about a certain phase; and transmitting the two-qubit state through the transmission waveguide using a pump pulse having the certain phase. A2. The method of A1, wherein the pump pulse is provided in a manner so that the transmission waveguide functions as an optical phase sensitive amplifier (OPSA). A3. The method of A1, wherein two-qubit state includes non-orthogonal quantum states. A4. The method of A1, wherein the two-qubit state is phase misaligned with the certain phase, and the pump pulse is capable of transmitting the two-qubit state notwithstanding the phase misalignment of the two-qubit state. A5. The method of A1, wherein the two-qubit state constructively interferes with the amplitude for pair creation in the amplifying transmission wave guide thereby facilitating transmission of the two-qubit state through the transmission waveguide. A6. The method of A1, wherein the transmission waveguide comprises a length of optical fiber and the transmitting comprises amplifying the two-qubit state over the length of the optical fiber using the pump pulse. A7. The method of A1, wherein the method is a method for transmitting multiple two-qubit states, and the two-qubit state is one of the multiple two-qubit states. A8. The method of A1, wherein the pump pulse is provided in a manner so that the transmission waveguide functions as a distributed optical phase sensitive amplifier (OPSA). A9. The method of A1, wherein the two-qubit state includes entangled quantum states. A10. The method of A1, wherein the two-qubit state constructively interferes with the amplitude for pair creation in the amplifying transmission wave guide thereby facilitating loss resilient transmission of the two-qubit state through the transmission waveguide. A12. The method of A1, wherein the transmission waveguide comprises a length of optical fiber and the transmitting comprises loss resilient transmission of the two-qubit state over the length of the optical fiber using the pump pulse. A13. The method of A1, wherein the method is a method for transmitting multiple two-qubit states in parallel, wherein the multiple two-qubit states are frequency multiplexed onto a common transmission channel. A14. The method of A1, wherein the method is a method for transmitting variable two-qubit states, and the variable two-qubit states are selected from a state space defined by varying the relative time-bin phase, φ, wherein $$|\psi_\pm(\phi)\rangle = \frac{1}{\sqrt{2}}[e^{\pm i\phi}|00\rangle + e^{\mp i\phi}|11\rangle].$$

B1. A device for transmitting a two-qubit state, the device comprising: a source, the source being configured to distribute the two-qubit state about a certain phase; and a transmission waveguide, the transmission waveguide being configured to propagate the two-qubit state using a pump pulse having the certain phase. B2. The device of B1, wherein the transmission waveguide comprises an optical phase sensitive amplifier (OPSA), the OPSA being configured to use the pump pulse with the certain frequency. B3. The device of B1, wherein the transmission waveguide comprises an optical phase sensitive amplifier (OPSA), the OPSA being configured to use the pump pulse with the certain phase. B4. The device of B1, wherein the transmission waveguide comprises a distributed optical phase sensitive amplifier (OPSA), the distributed OPSA being configured to use the pump pulse with the certain phase.

C1. A system for quantum communications comprising: a source, the source being configured to distribute a two-qubit state about a certain phase; a transmission waveguide, the transmission waveguide being configured to propagate the two-qubit state using a pump pulse having the certain phase; and a receiver, the receiver being configured to receive the two-qubit state. C2. The system of C1, wherein the transmission waveguide comprises an optical phase sensitive amplifier (OPSA), the OPSA being configured to use the pump pulse with the certain phase. C3. The system of C1, wherein the transmission waveguide comprises a distributed optical phase sensitive amplifier (OPSA), the distributed OPSA being configured to use the pump pulse with the certain phase.

D1. A method for transmitting a two-qubit state, the method comprising: propagating the two-qubit state onto a transmission waveguide, wherein the propagating includes distributing the two-qubit state about a certain phase; and using a pump pulse to transmit the two-qubit state through the transmission waveguide, wherein the pump pulse is provided in a manner so that the transmission waveguide functions as an optical phase sensitive amplifier (OPSA).

E1. A device for transmitting a two-qubit state, the device comprising: a source, the source being configured to distribute the two-qubit state about a certain phase; wherein the device is operative to use a pump pulse having the certain phase to transmit the two-qubit state through a transmission waveguide, wherein the device is operative to provide the pump pulse in a manner to configure the transmission waveguide as an optical phase sensitive amplifier (OPSA).

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects of the disclosure and the practical application, and to enable others of ordinary skill in the art to understand one or more aspects of the disclosure for various embodiments with various modifications as are suited to the particular use contemplated.

What is claimed is:

1. A method for transmitting a two-qubit state, the method comprising:
   propagating the two-qubit state onto a transmission waveguide, wherein the propagating includes distributing the two-qubit state about a certain phase; and
   transmitting the two-qubit state through the transmission waveguide using a pump pulse having the certain phase, wherein the pump pulse is provided in a manner so that the transmission waveguide functions as an optical phase sensitive amplifier (OPSA).

2. The method of claim 1, wherein two-qubit state includes non-orthogonal quantum states.

3. The method of claim 1, wherein the two-qubit state is phase misaligned with the certain phase, and the pump pulse is capable of transmitting the two-qubit state notwithstanding the phase misalignment of the two-qubit state.

4. The method of claim 1, wherein the transmission waveguide comprises a length of optical fiber and the transmitting comprises amplifying the two-qubit state over the length of the optical fiber using the pump pulse.

5. The method of claim 1, wherein the method is a method for transmitting multiple two-qubit states, and the two-qubit state is one of the multiple two-qubit states.

6. The method of claim 1, wherein the pump pulse is provided in a manner so that the transmission waveguide functions as a distributed optical pulse sensitive amplifier (OPSA).

7. The method of claim 1, wherein the two-qubit state includes entangled quantum states.

8. The method of claim 1, wherein the transmission waveguide comprises a length of optical fiber and the transmitting comprises loss resilient transmission of the two-qubit state over the length of the optical fiber using the pump pulse.

9. The method of claim 1, wherein the method is a method for transmitting variable two-qubit states, and the variable two-qubit states are selected from a state space defined by varying the relative time-bin phase, $\phi$, wherein $$|\psi_\pm(\phi)\rangle = \frac{1}{\sqrt{2}}[e^{\pm i\phi}|00\rangle + e^{\mp i\phi}|11\rangle].$$

10. A device for transmitting a two-qubit state, the device comprising:
    a source, the source being configured to distribute the two-qubit state about a certain phase; and
    a transmission waveguide, the transmission waveguide being configured to propagate the two-qubit state using a pump pulse having the certain phase, wherein the transmission waveguide comprises an optical phase sensitive amplifier (OPSA), the OPSA being configured to use the pump pulse with the certain phase.

11. A device for transmitting a two-qubit state, the device comprising:
    a source, the source being configured to distribute the two-qubit state about a certain phase;
    wherein the device is operative to use a pump pulse having the certain phase to transmit the two-qubit state through a transmission waveguide, wherein the device is operative to provide the pump pulse in a manner to configure the transmission waveguide as an optical phase sensitive amplifier (OPSA).

12. The device of claim 11, wherein two-qubit state includes non-orthogonal quantum states.

13. The device of claim 11, wherein the two-qubit state is phase misaligned with the certain phase, and the pump pulse is capable of transmitting the two-qubit state notwithstanding the phase misalignment of the two-qubit state.

14. The device of claim 11, wherein the device is operative so that the two-qubit state constructively interferes with amplitude for pair creation in the amplifying transmission waveguide thereby facilitating transmission of the two-qubit state through the transmission waveguide.

15. The device of claim 11, wherein the device is operative to provide the pump pulse in a manner so that the transmission waveguide functions as a distributed optical pulse sensitive amplifier (OPSA).

16. The device of claim 11, wherein the two-qubit state includes entangled quantum states.

17. The device of claim 11, wherein the device is operative so that the two-qubit state constructively interferes with the amplitude for pair creation in the amplifying transmission waveguide thereby facilitating loss resilient transmission of the two-qubit state through the transmission waveguide.

18. The device of claim 11, wherein the device is operative for transmitting multiple two-qubit states in parallel, wherein the multiple two-qubit states are frequency multiplexed onto a common transmission channel.

19. The device of claim 11, wherein the device is operative for transmitting variable two-qubit states, and the variable two-qubit states are selected from a state space defined by varying the relative time-bin phase, $\phi$, wherein $$|\psi_{\pm}(\phi)\rangle = \frac{1}{\sqrt{2}}[e^{\pm i\phi}|00\rangle + e^{\mp i\phi}|11\rangle].$$

* * * * *